United States Patent Office 2,913,359
Patented Nov. 17, 1959

2,913,359

FILTRATION PROCESS FOR STARCH

Glenn E. Pollock, Jr., Affton, and Harold A. Jett, St. Louis, Mo., Thomas Gerwitz, Jackson Heights, N.Y., and Barrett L. Scallet, Clayton, Mo., assignors to Anheuser-Busch, Incorporated, St. Louis, Mo., a corporation of Missouri No Drawing. Application September 19, 1957
Serial No. 684,862

12 Claims. (Cl. 127—71)

The present invention relates generally to the treatment of starch, and more particularly to a novel method for increasing the amount of water which is removed from a starch slurry during the filtration thereof, and to the surfactants which are used in the treatment.

In the commercial production of starch, a starch slurry is pumped to vacuum type filters at as high a solids concentration as is practical and the major portion of the water removed therefrom so as to produce a wet starch filter cake. The cake is then removed from the filter and dried by passing hot air through it until the moisture content is reduced to about 12%.

Naturally, if the filter cake contains a relatively large amount of entrained water, relatively more drying is required in order to reduce its water content to the desired level, as compared with a cake which contains less water.

Thus, when the cake is relatively wet, the rate of output of starch is reduced, or, if the rate of output is to be maintained constant it is necessary to employ additional drying equipment or increase the amount or the temperature of the hot air passing over the wet starch.

It is an object of the present invention therefore, to provide a novel method for increasing the amount of water which is removed from the starch slurry during the filtration step, without adversely affecting the normal filtering procedure or equipment. More particularly, it is an object to provide surfactants which can be added to the starch slurry prior to filtration so that more water can be removed from the starch during the filtration step than can be removed when no surfactants are used.

Another object is to provide surfactants which have varying degrees of effectiveness as to the amount of additional water which can be removed during the filtration step.

Further objects and advantages will be readily apparent from a consideration of the detailed description and the illustrative examples which follow.

Briefly, the invention comprises the step of adding a surfactant to the starch slurry prior to filtration, the surfactant being selected from a group of compounds which include certain polyoxyethylene esters and ethers.

Throughout the description and claims the designation "starch" will be understood to include corn starch, wheat starch, potato starch, tapioca starch, sago starch and cerava starch.

In normal practice, the starch slurry prior to filtration contains about 60% water. The water content is usually reduced to about 45% by filtration, and the water content is then further reduced to about 12% by hot air drying.

We have discovered that by adding certain surfactants to the starch slurry prior to filtration, the water content of the starch can be reduced to as low as about 35% by filtering, or by the selection of the proper surfactant, the reduction of water can be limited to 40%, or even 44%. Thus, by varying the type of surfactant (and to a certain degree the amount), the water content of the filter cake can be maintained at from about 35% up to 45%.

We have also learned that these same surfactants are effective with raw starch, lightly treated oxidized starch, heavily treated oxidized starch and thin boiling starches of all types.

Furthermore, the Baumé of the starch slurry does not seem to have any effect on the efficiency of the moisture removal from the filter cake, and although best results were obtained with certain of the surfactants when the pH of the slurry was about 4, good results were also obtained at ranges of pH of about 3 to about 10.

The surfactants which we have found to be satisfactory can be most conveniently grouped under 12 main headings.

The approximate amount of surfactant required to provide the maximum dewatering effect is in the neighborhood of 0.1%, based on the dry weight of starch being treated, but it has been determined that smaller amounts of these materials have a partial effect.

The surfactants include:

Group I—Polyoxyethylene esters of fatty acids in which the degree of polymerization (DP) of ethylene oxide is from about 2 to about 9, and the fatty acid contains from 12 to 18 carbon atoms. The term fatty acid containing from 12 to 18 carbon atoms as used herein includes an acid such as lauric, palmitic, stearic, and oleic, or mixed fatty and resin acids, or mixtures of such acids.

Specific surfactants in this group are:

(1) Polyoxyethylene dilaurate (DP 9)
(2) Polyoxyethylene monolaurate (DP 9)
(3) Polyoxyethylene monostearate (DP 9)
(4) Polyoxyethylene laurate (DP 4)
(5) Polyoxyethylene stearate (DP 5.6–8)
(6) Polyoxyethylene esters of mixed fatty and resin acids (tall oil acids)

Group II.—Polyoxyethylene sorbitol esters of fatty acids in which the DP of ethylene oxide is from about 6 to about 20, the fatty acid contains from 12 to 18 carbon atoms, and the sorbitol is esterified on from 2 to 6 hydroxyl groups and is not necessarily substituted on all sorbitol units.

Specific surfactants in this group are:

(1) Polyoxyethylene sorbitol pentalaurate (DP 20)
(2) Polyoxyethylene sorbitol hexalaurate (DP 29)
(3) Polyoxyethylene sorbitol 4.5 oleate (DP 6)
(4) Polyoxyethylene sorbitol tetraoleate (DP 6)
(5) Polyoxyethylene sorbitol tetra-tall oil (DP 20)
(6) Polyoxyethylene sorbitol dilaurate (DP 6)

Group III.—Polyoxyethylene sorbitan esters of fatty acids in which the DP of the ethylene oxide is from about 4 to about 20, the fatty acid contains 12 to 18 carbon atoms, and the sorbitan is esterified on from 1 to 3 hydroxyl groups and is not necessarily uniformly substituted on all sorbitan units.

Specific surfactants in this group are:

(1) Polyoxyethylene sorbitan monostearate (DP 4, M.W. 606)
(2) Polyoxyethylene sorbitan dilaurate (DP 8, M.W. 898)
(3) Polyoxyethylene sorbitan trioleate (DP 20, M.W. 1872)
(4) Polyoxyethylene sorbitan monolaurate (DP 10, M.W. 786)

Group IV.—Sorbitan esters of oleic or lauric acid in which the sorbitan is esterified in one position.

Specific surfactants in this group are:

(1) Sorbitan monolaurate (M.W. 347.4)
(2) Sorbitan monooleate (M.W. 429.6)

Group V.—Diethylene glycol esters of lauric acid.
A specific surfactant in this group is:

(1) Diethylene glycol monolaurate

*Group VI.*—Glyceryl esters of fatty acids containing 12 to 18 carbon atoms in which the glycerol is esterified in one or more positions but not in all three positions.

Specific surfactants in this group are:

(1) Glyceryl monolaurate
(2) Glyceryl oleostearate (saponification number 165 to 175, iodine value 50 to 60)
(3) Glyceryl monostearate
(4) Glyceryl monoricinoleate

*Group VII.*—Polyoxypropylene esters of fatty acids containing 12 to 18 carbon atoms.

A specific surfactant in this group is:

(1) Polyoxypropylene stearate (DP 8).

*Group VIII.*—Polyoxyethylene ethers of fatty alcohols containing 12 to 18 carbon atoms in which the DP of the polyoxyethylene is about 4 and the polyoxyethylene is substituted in one position.

A specific surfactant in this group is:

(1) Polyoxyethylene lauryl ether (DP 4).

*Group IX.*—Mixed ester-ethers of polyoxyethylene and fatty acids and fatty alcohols each containing from 12 to 18 carbon atoms.

A specific surfactant in this group is:

(1) Polyoxyethylene lauric acid laurate (DP 2).

*Group X.*—Glycerol mannitan esters of fatty acids containing 12 to 18 carbon atoms.

A specific surfactant in this group is:

(1) Glycerol mannitan laurate.

*Group XI.*—Copolymers of propylene oxide and ethylene oxide in which the polyoxyethylene is condensed on both ends of the polyoxypropylene portion of the molecule and the molecular weights are 1650 to 2520, approximately 10% to 40% of the molecule being polyoxyethylene.

A specific surfactant in this group is:

(1) A condensation product of polyoxypropylene and polyoxyethylene having a molecular weight of 1650 approximately 10% of the molecule being polyoxyethylene. (Wyandotte, Pluronic L-61.)

*Group XII.*—Nonyl phenols condensed with polyoxyethylene in which the DP of the polyoxyethylene ranges from about 4 to about 10.

Specific surfactants in this group are:

(1) Nonyl phenoxypolyoxyethanol (DP 4)
(2) Nonyl phenoxypolyoxyethanol (DP 5.5)
(3) Nonyl phenoxypolyoxyethanol (DP 10)

It is to be understood that all of the foregoing surfactants do not have the same degree of effectiveness and that in some instances, one or several may be preferred over the others. Also the cost of the surfactant determines to some degree, which ones are used.

The following examples are given only to illustrate the use of various of the surfactants which have been mentioned, and do not limit the scope of the invention in any way whatsoever.

*Example No. 1*

An amount of polyoxyethylene dilaurate (PEG 400 dilaurate, Glyco, DP 9) equivalent to .1%, based on the weight of starch solids present, was added to a 23° Baumé starch slurry at 125° F., and the slurry agitated for one hour. The slurry was diluted to 15° Baumé with 140° F. water and stirred an additional 20 minutes. The sample was filtered in a large Büchner funnel and the suction continued for 5 minutes after the disappearance of any surface water. At the end of this period, the starch filter cake so obtained was immediately sieved through a No. 10 mesh screen and duplicate samples of about 5 grams weighed into previously tared moisture pans. The samples were vacuum dried over night at 105° C., cooled in a desiccator, and weighed. The loss in weight divided by the original weight of the sample was taken as the water content of the starch cake. Its content was 35.0%, whereas a control treated under identical conditions but without using a surfactant, had 45% water.

*Example No. 2*

The same procedure was followed as in Example No. 1 except that we used .06% of polyoxyethylene sorbitol hexalaurate (G 1036, Atlas, DP 20). The water content of the filter cake was 34.6% as compared with 45% for the control.

*Example No. 3*

The same procedure was followed as in Example No. 1 except that we used .06% of polyoxyethylene sorbitan dilaurate (G 7076 H, Atlas, DP 8). The water content of the filter cake was 35.5% as compared with 45% for the control.

*Example No. 4*

The same procedure was followed as in Example No. 1 except that we used .1% of sorbitan monolaurate (Span 20, Atlas, M.W. 347.4). The water content of the filter cake was 34.8% as compared with 45% for the control.

*Example No. 5*

The same procedure was followed as in the previous examples except that we used .06% of diethylene glycol monolaurate (Diglycolaurate S, Glyco). The water content of the filter cake was 33.6% as compared with 45% for the control.

*Example No. 6*

The same procedure was followed as above except that we used .1% of glyceryl monolaurate (S–547 Glyco). The water content of the filter cake was 36.1% as compared with 45% for the control.

*Example No. 7*

The same procedure was followed as in the previous examples except that we used .1% of polyoxypropylene stearate (G 3608, Atlas, DP 8). The water content of the filter cake was 44.0% as compared with 45% for the control.

*Example No. 8*

The same procedure was followed as before except that we used .1% of polyoxyethylene lauryl ether (Brij 30, Atlas, DP 4). The water content of the filter cake was 38.6% as compared with 45% for the control.

*Example No. 9*

The same procedure was followed as before except that we used .06% of polyoxyethylene lauric acid laurate (G 2282, Atlas, DP 2). The water content of the filter cake was 35.3% as compared with 45% for the control.

*Example No. 10*

The same procedure was followed as in the other examples except that we used .1% of glycerol mannitan laurate (NNO Atlas). The water content of the filter cake was 40.4% as compared with 45% for the control.

*Example No. 11*

The same procedure was followed as in the other examples except that we used .06% of a condensation product of polyoxypropylene and polyoxyethylene (L–61, Wyandotte Pluronic). The water content of the filter cake was 40.0% as compared with 45% for the control.

*Example No. 12*

The same procedure was followed as in Examples 1 through 11 except that we used .06% of nonyl phenoxypolyoxyethanol (Igepal 530, DP 5.5, General Aniline).

The water content of the filter cake in this instance was 37.5% as compared with 45% for the control cake.

By way of further illustrating the advantages of the present invention; in normal practice, the filter cake comprises about 55 parts starch and about 45 parts water. About 38.4 parts of water are driven off by utilizing a hot air drier to provide a starch consisting of 55 parts starch and 6.6 part water, i.e. the normal 12% moisture pearl starch.

By using the teachings of the present invention, the moisture of the wet filter cake can be easily controlled to provide 65 parts starch and 35 parts water. Thus, only 27.2 parts of water need by driven off by heat (as compared with 38.4 parts) in order to provide a 12% moisture starch which comprises 65 parts starch and 7.8 parts water.

The advantage of the instant method over the known methods can be illustrated more clearly by comparing the amount of water which has to be driven off to produce 100 pounds of commercial 12% moisture pearl starch. In the known method, the wet starch filter cake consists of 88 parts starch and 72 parts water. Thus, 60 parts of water have to be removed in order to provide a 12% starch. In the present method the wet starch filter cake contains 88 parts starch and only 47.4 parts water. Consequently, only 35.4 parts of water have to be removed (as compared with 60 parts) in order to provide 100 pounds of commercial 12% moisture starch. Thus, it is necessary to drive off about 25 pounds more water using the known process for every 100 pounds of commercial 12% starch as compared with the amount of water which must be driven off utilizing the teachings of the present invention.

There are other advantages in using the present invention. For example, sometimes the starch filters do not dry the starch properly, and "puddles" or excessively wet filter cakes result. When these wet filter cakes go through the drier, they are not properly dried. This may be due to a defective filter, low vacuum, or because of a type of starch which does not lend itself to a ready filtration. However, when a surfactant of the type described is used, these problems are less likely to occur.

Thus, it is apparent that there has been provided a novel method for using selected surfactants to increase the amount of water which can be removed from a starch slurry during filtration, which fulfills all of the objects and advantages sought therefore.

It is to be understood that the foregoing description and examples have been given only by way of illustration, and that both the process and the surfactants are susceptible of variation without departing from the scope of the invention, which is limited only by the claims which follow.

We claim:

1. The method of lowering the water content of a starch slurry wherein the starch is in granule form, which includes the steps of adding to the slurry a minor portion of an oxyalkylene containing compound having surface active properties and effective to reduce the water content of the slurry below that which results from dewatering the slurry without the use of such compound to a level of between about 35% to about 45% when the slurry is dewatered, and dewatering the slurry.

2. The method of lowering the water content of a starch slurry wherein the starch is in granule form, which includes the steps of adding to the slurry, a minor portion of a surfactant sufficient to reduce the water content of the slurry to a level of between about 35% to about 45% when the slurry is dewatered, selected from the group consisting of: polyoxyethylene esters of fatty acids containing 12 to 18 carbon atoms in which the degree of polymerization of ethylene oxide is from about 2 to about 9; polyoxyethylene sorbitol esters of fatty acids containing 12 to 18 carbon atoms in which the degree of polymerization of ethylene oxide is from about 6 to about 20, and the sorbitol is esterified on from 2 to 6 hydroxyl groups but is not necessarily substituted on all sorbitol units; polyoxyethylene sorbitan esters of fatty acids containing 12 to 18 carbon atoms in which the degree of polymerization of ethylene oxide is from about 4 to about 20, and the sorbitan is esterified on from 1 to 3 hydroxyl groups but is not necessarily uniformly substituted on all sorbitan units; sorbitan esters of fatty acids containing 12 to 18 carbon atoms in which the sorbitan is esterified in one position; diethylene glycol esters of fatty acids containing 12 to 18 carbon atoms; glyceryl esters of fatty acids containing 12 to 18 carbon atoms in which the glycerol is esterified in no more than two positions; polyoxypropylene esters of fatty acids containing 12 to 18 carbon atoms; polyoxyethylene ethers of fatty alcohols containing 12 to 18 carbon atoms in which the degree of polymerization of the polyoxyethylene is about 4 and the polyoxyethylene is substituted in one position; mixed ester-ethers of polyoxyethylene and fatty acids and fatty alcohols each containing from 12 to 18 carbon atoms; glycerol mannitan esters of fatty acids containing 12 to 18 carbon atoms; copolymers of propylene oxide and ethylene oxide in which the polyoxyethylene is condensed on both ends of the polyoxypropylene portion of the molecule and the molecular weights are 1650 to 2520, approximately 10% to 40% of the molecule being polyoxyethylene; and nonyl phenols condensed with polyoxyethylene in which the degree of polymerization ranges from about 4 to about 10 and dewatering the slurry.

3. The method of lowering the water content of a starch slurry wherein the starch is in granule form, which includes the steps of adding to the slurry a minor portion sufficient to reduce the water content of the slurry to a level of between about 35% to about 45% when the slurry is dewatered, of a polyoxyethylene ester of a fatty acid containing 12 to 18 carbon atoms in which the degree of polymerization of ethylene oxide is from about 2 to about 9, and dewatering the slurry.

4. The method of lowering the water content of a starch slurry wherein the starch is in granule form, which includes the steps of adding to the slurry a minor portion sufficient to reduce the water content of the slurry to a level of between about 35% to about 45% when the slurry is dewatered, of a polyoxyethylene sorbitol ester of a fatty acid containing 12 to 18 carbon atoms in which the degree of polymerization of ethylene oxide is from about 6 to about 20, and the sorbitol is esterified on from 2 to 6 hydroxyl groups but is not necessarily substituted on all sorbitol units, and dewatering the slurry.

5. The method of lowering the water content of a starch slurry wherein the starch is in granule form, which includes the steps of adding to the slurry a minor portion sufficient to reduce the water content of the slurry to a level of between about 35% to about 45% when the slurry is dewatered, of a polyoxyethylene sorbitan ester of a fatty acid containing 12 to 18 carbon atoms in which the degree of polymerization of ethylene oxide is from about 4 to about 20, and the sorbitan is esterified on from 1 to 3 hydroxyl groups but is not necessarily uniformly substituted on all sorbitan units, and dewatering the slurry.

6. The method of lowering the water content of a starch slurry wherein the starch is in granule form, which includes the steps of adding to the slurry a minor portion sufficient to reduce the water content of the slurry to a level of between about 35% to about 45% when the slurry is dewatered, of a diethylene glycol ester of fatty acids containing 12 to 18 carbon atoms, and dewatering the slurry.

7. The method of lowering the water content of a starch slurry wherein the starch is in granule form, which includes the steps of adding to the slurry a minor portion sufficient to reduce the water content of the slurry to a level of between about 35% to about 45% when the slurry is dewatered, of a glyceryl ester of a fatty acid containing 12 to 18 carbon atoms in which the glycerol is esterified in no more than two positions, and dewatering the slurry.

8. The method of removing a predetermined amount of water from a starch slurry wherein the starch is in granule form, which includes the steps of adding to the slurry at least about 0.02% by weight based on the weight of dry starch present, of a polyoxyethylene ester of a fatty acid selected from the group consisting of polyoxyethylene monolaurate, polyoxyethylene monostearate, polyoxyethylene dilaurate, polyoxyethylene distearate, and polyoxyethylene tall oil, and dewatering said starch slurry to a water content of between about 35% and 45% by weight.

9. The method of removing a predetermined amount of water from a starch slurry wherein the starch is in granule form, which includes the steps of adding to the slurry at least about 0.02% by weight based on the weight of dry starch present, of a polyoxyethylene sorbitan ester of a fatty acid in which the degree of polymerization of ethylene oxide is from about 6 to about 20, the fatty acid contains from 12 to 18 carbon atoms, and the sorbitol is esterified on from 2 to 6 hydroxyl groups but is not necessarily substituted on all sorbitol units, selected from the group consisting of polyoxyethylene sorbitol pentalaurate, polyoxyethylene sorbitol hexalaurate, polyoxyethylene sorbitol 4.5 oleate, polyoxyethylene sorbitol tetraoleate, polyoxyethylene sorbitol tetra-tall oil, and polyoxyethylene sorbitol dilaurate, and dewatering said starch slurry to a water content of between about 35% to about 45% by weight.

10. The method of removing a predetermined amount of water from a starch slurry wherein the starch is in granule form, which includes the steps of adding to the slurry at least about 0.02% by weight based on the weight of dry starch present of a polyoxyethylene sorbitan ester of a fatty acid in which the degree of polymerization of ethylene oxide is from about 2 to about 9, selected from the group consisting of polyoxyethylene sorbitan monostearate, polyoxyethylene sorbitan dilaurate, polyoxyethylene sorbitan trioleate, and polyoxyethylene sorbitan monolaurate, and dewatering said starch slurry to a water content of between about 35% to about 45% by weight.

11. The method of removing a predetermined amount of water from a starch slurry wherein the starch is in granule form, which includes the step of adding to the slurry at least about 0.02% by weight based on the weight of dry starch present, of a glyceryl ester of a fatty acid in which the glycerol is esterified in no more than two positions, selected from the group consisting of glyceryl monolaurate, glyceryl oleostearate, glyceryl monostearate, and glyceryl monoricinoleate, and dewatering said starch slurry to a water content of between about 35% to about 45% by weight.

12. The method of removing a predetermined amount of water from a starch slurry wherein the starch is in granule form, which includes the steps of adding to the slurry at least about 0.02% by weight based on the weight of dry starch present, of diethylene glycol monolaurate, and dewatering said starch slurry to a water content of between about 35% to about 45% by weight.

References Cited in the file of this patent

UNITED STATES PATENTS

| 2,482,917 | Kaplan | Sept. 27, 1949 |
| 2,666,038 | Eisen | Jan. 12, 1954 |
| 2,729,567 | Heisler | Jan. 3, 1956 |

OTHER REFERENCES

Atlas Spans and Tweens, Surface Active Agents, November 1942, Wilmington, Del., p. 5.